United States Patent
Skobeltsyn et al.

(10) Patent No.: US 11,848,009 B2
(45) Date of Patent: *Dec. 19, 2023

(54) ADAPTIVE INTERFACE IN A VOICE-ACTIVATED NETWORK

(71) Applicant: GOOGLE LLC, Mountain View, CA (US)

(72) Inventors: Gleb Skobeltsyn, Kilchberg (CH); Mihaly Kozsevnyikov, Zug (CH); Vladimir Vuskovic, Zollikerberg (CH)

(73) Assignee: GOOGLE LLC, Mountain View, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/397,533

(22) Filed: Aug. 9, 2021

(65) Prior Publication Data
US 2021/0366469 A1  Nov. 25, 2021

Related U.S. Application Data

(63) Continuation of application No. 15/977,699, filed on May 11, 2018, now Pat. No. 11,087,748.

(51) Int. Cl.
*G10L 15/18* (2013.01)
*G06F 3/16* (2006.01)
(Continued)

(52) U.S. Cl.
CPC .......... *G10L 15/1815* (2013.01); *G06F 3/167* (2013.01); *G06F 40/30* (2020.01);
(Continued)

(58) Field of Classification Search
CPC . G10L 15/1815; G10L 15/1822; G10L 15/22; G10L 2015/223; G10L 2015/226;
(Continued)

(56) References Cited

U.S. PATENT DOCUMENTS

| | | | | |
|---|---|---|---|---|
| 5,583,761 A | * | 12/1996 | Chou | G06F 9/454 |
| | | | | 715/201 |
| 7,904,297 B2 | * | 3/2011 | Mirkovic | G06F 40/40 |
| | | | | 704/235 |

(Continued)

FOREIGN PATENT DOCUMENTS

CN   102137085   7/2011

OTHER PUBLICATIONS

Siegal, Daniel, IP Attys Load Up Apps' Legal Challenges At 'Silicon Beach', Law360, Los Angeles, California, 4 pages; dated Feb. 2, 2017.

(Continued)

*Primary Examiner* — Michael Colucci
(74) *Attorney, Agent, or Firm* — Gray Ice Higdon

(57) ABSTRACT

The systems and methods of the present disclosure generally relate to a data processing system that can identify and surface alternative requests when presented with ambiguous, unclear, or other requests to which a data processing system may not be able to respond. The data processing system can improve the efficiency of network transmissions to reduce network bandwidth usage and processor utilization by selecting alternative requests that are responsive to the intent of the original request.

17 Claims, 5 Drawing Sheets

(51) Int. Cl.
  *G10L 15/22*    (2006.01)
  *G06F 40/30*   (2020.01)
(52) U.S. Cl.
  CPC .......... *G10L 15/1822* (2013.01); *G10L 15/22* (2013.01); *G10L 2015/223* (2013.01); *G10L 2015/226* (2013.01)
(58) Field of Classification Search
  CPC ......... G10L 15/26; G10L 15/30; G06F 3/167; G06F 40/30; G06F 40/268; G06F 40/295; G06F 16/90332; G06F 40/274; G06N 5/04
  See application file for complete search history.

(56) References Cited

U.S. PATENT DOCUMENTS

| | | | |
|---|---|---|---|
| 8,626,511 | B2 | 1/2014 | LeBeau et al. |
| 10,002,449 | B2* | 6/2018 | Monnier ............. G06F 3/04845 |
| 10,216,856 | B2* | 2/2019 | Kaplinger ............. H04L 67/535 |
| 10,255,101 | B2* | 4/2019 | Zielinski ............... G06F 9/4411 |
| 10,365,727 | B2* | 7/2019 | Motaparti ........... G06F 3/04886 |
| 10,438,264 | B1* | 10/2019 | Viswanathan ........... G06N 5/04 |
| 11,204,787 | B2* | 12/2021 | Radebaugh ......... G06F 16/3329 |
| 2002/0173955 | A1* | 11/2002 | Reich ...................... G10L 15/22 704/E15.04 |
| 2002/0184016 | A1* | 12/2002 | Hartley ................... G10L 15/08 704/235 |
| 2006/0200347 | A1* | 9/2006 | Kim ........................ G10L 15/22 704/E15.04 |
| 2009/0063145 | A1* | 3/2009 | Hakkani-Tur ....... G10L 15/1822 704/E15.001 |
| 2011/0060587 | A1* | 3/2011 | Phillips .................. G10L 15/30 704/235 |
| 2011/0096983 | A1* | 4/2011 | Jensen ................. G06V 30/268 382/187 |
| 2013/0300664 | A1* | 11/2013 | Winer .................... G06F 40/274 704/9 |
| 2013/0317805 | A1* | 11/2013 | Enright ................. G06F 40/295 704/9 |
| 2014/0184471 | A1* | 7/2014 | Martynov ........... H04M 1/0266 345/1.2 |
| 2015/0235641 | A1* | 8/2015 | VanBlon ................. G10L 15/24 704/235 |
| 2015/0378579 | A1* | 12/2015 | Kaplinger ............. H04L 67/303 715/745 |
| 2015/0378685 | A1 | 12/2015 | Kaplinger |
| 2016/0148616 | A1* | 5/2016 | Takayanagi ............. G10L 15/25 704/235 |
| 2016/0198424 | A1* | 7/2016 | Luo ....................... H04W 24/10 370/338 |
| 2016/0246762 | A1* | 8/2016 | Eaton .................. G06F 3/04847 |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0236524 | A1 | 8/2017 | Ray et al. |
| 2017/0257456 | A1 | 9/2017 | Vaish et al. |
| 2017/0285765 | A1* | 10/2017 | Kimura ................... G06F 3/011 |
| 2017/0315993 | A1* | 11/2017 | Bao ....................... G06F 40/284 |
| 2017/0351767 | A1* | 12/2017 | Suzuki .................. G06F 16/686 |
| 2017/0358301 | A1 | 12/2017 | Raitio et al. |
| 2018/0143965 | A1* | 5/2018 | Willson .................. G06F 40/30 |
| 2018/0158459 | A1* | 6/2018 | Yamagami ........... G06F 16/3344 |
| 2018/0189628 | A1* | 7/2018 | Kaufmann ............. G06N 3/006 |
| 2018/0314343 | A1* | 11/2018 | Montaldi .............. G06F 40/274 |
| 2019/0266287 | A1* | 8/2019 | Chen .................. G06F 16/3329 |

OTHER PUBLICATIONS

Unknown Author, "Dolphin' attacks fool Amazon, Google voice assistants", BBC News, ; 8 pages; dated Sep. 7, 2017.
Willens, Max, "For publishers, Amazon Alexa holds promise but not much money (yet)", Digiday, 6 pages; dated Jul. 6, 2017.
European Patent Office; Summons to attend oral proceedings pursuant to Rule 115(1) issued in Application No. 19712877.0, 11 pages, dated Apr. 5, 2022.
European Patent Office; Communication Pursuant to Article 94(3) EPC; 10 pages; dated Dec. 14, 2020.
International Search Report and Written Opinion of the International Searching Authority for Appl. Ser. No. PCT/US2019021387 dated May 16, 2019.
Walmart and Google to offer voice-enabled shopping, BBC News, 10 pages; dated Aug. 23, 2017.
Abrams, Help users find, interact & re-engage with your app on the Google Assistant, Google Developers Blog; 16 pages; dated Nov. 15, 2017.
Albrecht, "Alexa, How Can You Be Used in Restaurants?", the spoon, 6 pages; dated Dec. 10, 2017.
Amazon, "Echo Look Hands-Free Camera and Style Assistant", reprinted from https://www.amazon.com/gp/product/B0186JAEWK?ref%5F=cm%5Fsw%5Fr%5Ffa%5Fdp%5Ft2%5F C5oazbJTKCB18 &pldnSite=1 on Aug. 22, 2017 (7 pages) Barr, "AWS DeepLens—Get Hands-On Experience with Deep Learning With Our New Video Camera", AWS News Blog, 11 pages; dated Nov. 29, 2017.
Barr, "AWS DeepLens—Get Hands-On Experience with Deep Learning With Our New Video Camera", AWS News Blog, Nov. 29, 2017. 11 pages. 2017.
Broussard, Mitchel, "Chatbot-Like Siri Patent Includes Intelligent Image, Video, and Audio Recognition within Messages", MacRumors,7 pages; dated May 11, 2017.
Buckland et al., "Amazon's Alexa Takes Open-Source Route to Beat Google Into Cars", Bloomberg, 6 pages; dated Feb. 27, 2018.
Chen, Lulu Yilun, "Alibaba Challenges Google, Amazon With New Echo-Like Device", Bloomberg Technology, 3 pages; dated Jul. 5, 2017.
Clover, Juli, "Amazon and Google Want to Turn Their Smart Home Speakers Into Telephone Replacements", MacRumors, 5 pages; dated Feb. 15, 2017.
Coberly, "Apple patent filing reveals potential whispering Siri functionality", Techspot, 4 pages; dated Dec. 14, 2017.
Collins, et al., "Can Twitter Save Itself?", cnet, Apr. 26, 2017, reprinted from https://www.cnet.com/news/twitter-q1-2017-earnings/ on Aug. 22, 2017; 2 pages Aug. 22, 2017.
Crist, Ry, "Logitech Harmony's Alexa Skill just got a whole lot better", cnet, 2 pages; dated Jul. 13, 2017.
Estes, "Amazon's Newest Gadget Is a Tablet That's Also an Echo", Gizmodo, 3 pages; dated Sep. 19, 2017.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages. Forrest, Conner, "Essential Home wants to be bridge between Amazon's Alexa, Apple's Siri, and Google Assistant", TechRepublic, 10 pages; dated May 31, 2017.
Foxx, Chris, "Apple reveals HomePod smart speaker", BBC News, 6 pages; dated Jun. 5, 2017.
Gebhart, Andrew, "Google Assistant is spreading, but it needs its own Echo Dot", cnet, 7 pages; dated May 20, 2017.
Gebhart, Andrew, Google Home to the Amazon Echo: 'Anything you can do . . . ', cnet, 7 pages; dated May 18, 2017.
Gibbs, Samuel, "Your Facebook Messenger app is about to be filled with ads", The Guardian, 3 pages; dated Jul. 12, 2017.
Golgowski, Nina, "This Burger King Ad Is Trying to Control Your Google Home Device", Huffpost, 7 pages; dated Apr. 12, 2017.
Google Developers, "GoogleAssistant SDK" reprinted from https://developers.google.com/assistant/sdk/ on Aug. 22, 2017; 4 pages Aug. 22, 2017.
Google Inc., Products Feed Specification, printed from Internet address: http://www.support.google.com/merchants/bin/answer.py?hl=en&answer=188494#US, 6 pages; dated Mar. 18, 2013.
Google Inc., Supported File Formats, printed from Internet address: http://www.support.google.com/merchants/bin/ answer.py?hl=en &answer=160567, 1 pages; dated Mar. 18, 2013.
Gurman, et al., "Apple Is Manufacturing a Siri Speaker to Outdo Google and Amazon", Bloomberg, 5 pages; dated May 31, 2017.

(56) References Cited

OTHER PUBLICATIONS

Hardwick, Tim, "Facebook Smart Speaker Coming Next Year With 15-inch Touch Panel", MacRumors, 5 pages; dated Jul. 25, 2017.
Heater, "Amazon Alexa devices can finally tell voices apart", TechCrunch, Oct. 11, 2017.
Johnston, "Amazon Whirlwind: New Echo, Plus, Spot, Connect, Fire TV Take The Stage", Twice, 4 pages; dated Sep. 27, 2017.
Kelion, "Amazon revamps Echo smart speaker family", BBC News, 11 pages; dated Sep. 27, 2017.
Kelion, Leo, "Amazon's race to make Alexa smarter", BBC News, 8 pages; dated Jul. 28, 2017.
Koetsier, John, "Ads on Amazon Echo: Wendy's, ESPN, And Progressive Among Brands Testing", Forbes, 2 pages; dated May 11, 2017.
Krishna, "Jim Beam's smart decanter will pour you a shot when you ask", engadget, 3 pages; dated Nov. 29, 2017.
Lacy, "Improving search and advertising are the next frontiers for voice-activated devices", TechCrunch, 13 pages; dated Dec. 20, 2017.
Larson, Selena, "Google Home now recognizes your individual voice", CNN Money, San Francisco, California, 3 pages; dated Apr. 20, 2017.
Lee, Take Two for Samsung's troubled Bixby assistant, BBC News, 6 pages; dated Oct. 19, 2017.
Lee, Dave, "The five big announcements from Google I/O", BBC News, 9 pages; dated May 18, 2017.
Lund, Pamela, Mastering Google Product Feeds and Product Listing Ads $2013 Part 1, found at http://www.blueglass.com/blog/mastering-google-product-feeds-and-product-listing-ads-part-1/#comments; 17 pages; dated Dec. 28, 2013.
Nieva, Richard, "Google Home and eBay can tell you how much that's worth", cnet,3 pages; dated Mar. 8, 2017.
Novet, et al., "Amazon is getting ready to bring Alexa to work", CNBC, 4 pages; dated Nov. 29, 2017.
Palladino, "Garmin teamed up with Amazon to make a tiny Echo Dot for your car", ars Technica, 2 pages; dated Oct. 17, 2017.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, 6 pages, dated Aug. 22, 2017.
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, 3 pages; dated Aug. 22, 2017.
Perez, "Alexa's 'Routines' will combine smart home control with other actions, like delivering your news and weather", TechCrunch, 10 pages; dated Sep. 28, 2017.
Perez, Sarah, "The first ad network for Alexa Skills shuts down following Amazon's policy changes", Tech Crunch,6 pages; dated Jun. 15, 2017.
Porter, Jon, "Amazon Echo Show release date, price, news and features", Techradar, 14 pages; dated Jun. 26, 2017.
Pringle, "'I'm sorry to hear that': Why training Siri to be a therapist won't be easy", CBC News, 3 pages; dated Sep. 24, 2017.
Purcher, Jack, Today Google Home's Virtual Assistant can learn its Owner's voice for Security Reasons like Apple's Patent Pending Idea, 4 pages; dated Apr. 20, 2017.
Sablich, Justin, "Planning a Trip With the Help of Google Home", New York Times, 6 pages; dated May 31, 2017.
Seifert, Dan, "Samsung's new virtual assistant will make using your phone easier", The Verge, 6 pages; dated Mar. 20, 2017.
Sherr, Ian, "IBM built a voice assistant for cybersecurity", cnet, 2 pages; dated Feb. 13, 2017.
European Patent Office; Provisional Opinion issued in Application No. 19712877.0, 14 pages, dated Jan. 18, 2023.
China National Intellectual Property Administration; Notification of First Office Action issued in Application No. 201980002074.X; 30 pages; dated Mar. 22, 2023.

\* cited by examiner

ADAPTIVE INTERFACE IN A VOICE-ACTIVATED NETWORK

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The network transmissions corresponding ambiguous requests can generate numerous unnecessary network traffic between computing devices.

SUMMARY

According to at least one aspect of the disclosure, a system to generate voice-based interfaces in a networked system can include a data processing system. The data processing system can execute a natural language processor (NLP) component, an interface management component, and a direct action application programming interface (API). The data processing system can receive, at an interface of the data processing system, an input audio signal detected by a sensor of a client device. The data processing system can parse the input audio signal to identify a plurality of candidate requests based on the input audio signal. The data processing system can determine an interface type of the client device. The data processing system can select a portion the plurality of candidate requests based on the interface type of the client device. The data processing system can generate an action data structure for each of the portion of the plurality of the candidate requests based on the interface type of the client device. The data processing system can transmit, to the client device, the action data structure for each of the portion of the plurality of candidate requests based on the interface type of the client device.

According to at least one aspect of the disclosure, a method to generate voice-based interfaces in a networked system can include receiving, by a natural language processor component executed by a data processing system via an interface, an input audio signal detected by a sensor of a client device. The method can include parsing, by the natural language processor component, the input audio signal to identify a plurality of candidate requests based on the input audio signal. The method can include determining, by an interface management component executed by the data processing system, an interface type of the client device. The method can include selecting, by the interface management component, a number of the plurality of candidate requests based on the interface type of the client device. The method can include generating, by a direct action application programming interface of the data processing system, an action data structure for each of the number of the plurality of candidate requests based on the interface type of the client device. The method can include transmitting, by the interface to the client device, the action data structure for each of the number of plurality of candidate requests based on the interface type of the client device.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for generating interfaces in a voice activated computer network environment. The various concepts introduced above and discussed in greater detail below may be implemented in any of numerous ways.

The systems and methods of the present disclosure generally relate to a data processing system that can identify and surface alternative requests when presented with ambiguous, unclear, or other requests to which a data processing system may not be able to respond. The data processing system can improve the efficiency of network transmissions to reduce network bandwidth usage and processor utilization by selecting alternative requests that are responsive to the intent of the original request. Selecting and responding to the alternative requests can save bandwidth by not having to transmit error messages or follow up messages to client devices requesting additional information or data about the original request. To further save bandwidth and computational resources, the data processing system can select which of the additional responses for which the data processing system will generate a response based on an interface type of the client device that transmitted the request to the data processing system. For example, based on the screen size (or lack thereof) of the client device, the data processing system can select one or a subset of the alternative requests for which it generates responses. Selecting and responding to only a portion of the possible alternative requests can save bandwidth by not transmitting to the client device responses that were generates in response to all the possible interpretations of the original request.

Figure 1:
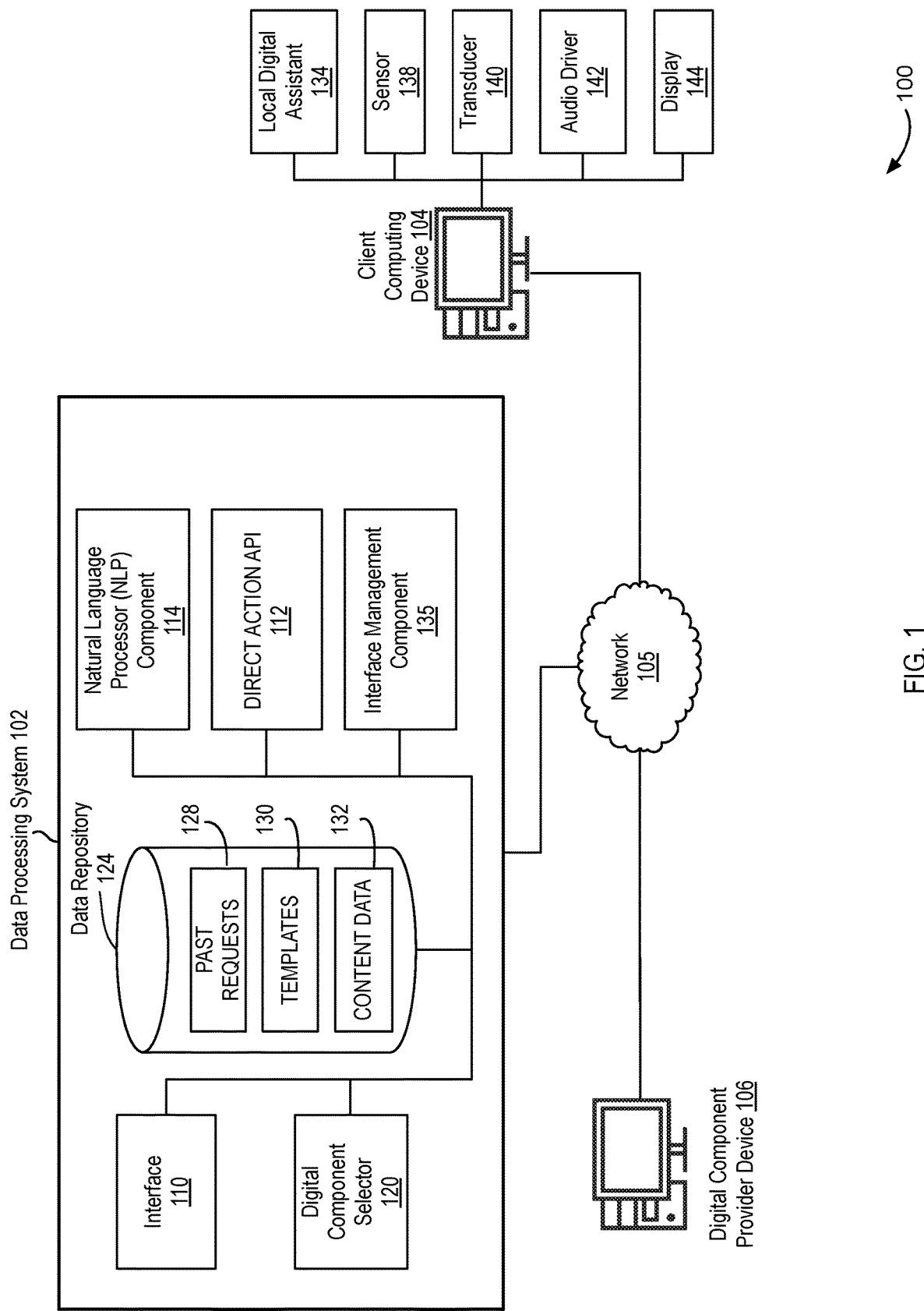
FIG. 1 illustrates an example system to generate interfaces in a voice-activated system, in accordance with an example of the present disclosure.

FIG. 1 illustrates an example system 100 to generate interfaces in a voice-activated system. The system 100 can include a digital component selection infrastructure. The system 100 can include a data processing system 102. The data processing system 102 can communicate with one or more digital component provider devices 106 (e.g., a content provider device) or client computing devices 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, digital assistant, personal digital assistant, smartwatch, wearable device, smart phone, portable computers, or speaker. For example, via the network 105 a user of the client computing device 104 can access information or data provided by a digital component provider device 106. The client computing device 104 may or may not include a display. For example, the client computing device 104 may include limited types of user interfaces, such as a microphone and speaker (e.g., the client computing device 104 can include a voice-drive or audio-based interface). The primary user interface of the computing device 104 may be a microphone and speaker. The client computing device 104 can be speaker-based digital assistant device.

The network 105 can include or constitute a display network, e.g., a subset of information resources available on the internet that are associated with a content placement or search engine results system, or that are eligible to include third party digital components. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the digital component provider device 106.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wire line network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example, with the computing device 104 or the digital component provider device 106. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high-performance storage systems on localized high-performance networks. Centralization of all or some of the data processing system 102 components, including servers and storage systems, and coupling them with advanced system management tools allows more efficient use of server resources, which saves power and processing requirements and reduces bandwidth usage.

The client computing device 104 can include, execute, interface, or otherwise communicate with one or more of at least one local digital assistant 134, at least one sensor 138, at least one transducer 140, at least one audio driver 142, or at least one display 144. The sensor 138 can include, for example, a camera, an ambient light sensor, proximity sensor, temperature sensor, accelerometer, gyroscope, motion detector, GPS sensor, location sensor, microphone, video, image detection, or touch sensor. The transducer 140 can include or be part of a speaker or a microphone. The audio driver 142 can provide a software interface to the hardware transducer 140. The audio driver 142 can execute the audio file or other instructions provided by the data processing system 102 to control the transducer 140 to generate a corresponding acoustic wave or sound wave. The display 144 can include one or more hardware or software component configured to provide a visual indication or optical output, such as a light emitting diode, organic light emitting diode, liquid crystal display, laser, or display.

The local digital assistant 134 can include or be executed by one or more processors, logic array, or memory. The local digital assistant 134 can be pre-processor. The local digital assistant 134 can execute any of the components of the data processing system 102. The local digital assistant 134 can detect a keyword and perform an action based on the keyword. The local digital assistance 134 can execute instances of the components executed by the data processing system 102 or can perform any of the functions of the data processing system 102. The local digital assistant 134 can pre-process input audio signals received by the client computing device 104. For example, the local digital assistant 134 can filter out one or more terms or modify the terms prior to transmitting the terms as data to the data processing system 102 for further processing. The local digital assistant 134 can convert the analog audio signals detected by the transducer 140 into a digital audio signal and transmit one or more data packets carrying the digital audio signal to the data processing system 102 via the network 105. The local digital assistant 134 can transmit data packets carrying some or all the input audio signal responsive to detecting an instruction to perform such transmission. The instruction can include, for example, a trigger keyword or other keyword or approval to transmit data packets comprising the input audio signal to the data processing system 102.

The local digital assistant 134 can perform a pre-filtering or pre-processing on the input audio signal to remove certain frequencies of audio. The pre-filtering can include filters such as a low-pass filter, high-pass filter or a bandpass filter. The filters can be applied in the frequency domain. The filters can be applied using digital signal processing techniques. The filter can be configured to keep frequencies that correspond to a human voice or human speech, while eliminating frequencies that fall outside the typical frequencies of human speech. For example, a bandpass filter can be configured to remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. The local digital assistant 134 on the computing device 104 can apply the bandpass filter prior to transmitting the input audio signal to the data processing system 102, thereby reducing network bandwidth utilization. However, based on the computing resources available to the computing device 104 and the available network bandwidth, it may be more efficient to provide the input audio signal to the data processing system 102 to allow the data processing system 102 to perform the filtering.

The local digital assistant 134 can apply additional pre-processing or pre-filtering techniques such as noise reduction techniques to reduce ambient noise levels that can interfere with natural language processor. Noise reduction techniques can improve accuracy and speed of natural language processor, thereby improving the performance of the data processing system 102 and manage rendering of a graphical user interface provided via the display 144.

The client computing device 104 can be associated with an end user that enters voice queries as audio input into the client computing device 104 (via the sensor 138 or transducer 140) and receives audio (or other) output from the data processing system 102 or digital component provider device 106 to present, display, or render to the end user of the client computing device 104. The digital component can include a computer-generated voice that can be provided from the data processing system 102 or digital component provider device 106 to the client computing device 104. The client computing device 104 can render the computer-generated voice to the end user via the transducer 140 (e.g., a speaker). The computer-generated voice can include recordings from a real person or computer generated language. The client computing device 104 can provide visual output via a display device 144 communicatively coupled to the computing device 104.

The end user that enters the voice queries to the client computing device 104 can be associated with multiple client computing devices 104. For example, the end user can be associated with a first client computing device 104 that can be a speaker-based digital assistant device, a second client computing device 104 that can be a mobile device (e.g., a smartphone), and a third client computing device 104 that can be a desktop computer. The data processing system 102 can associate each of the client computing devices 104 through a common login, location, network, or other linking data. For example, the end user may log into each of the client computing devices 104 with the same account user name and password.

The client computing device 104 can receive an input audio signal detected by a sensor 138 (e.g., microphone) of the computing device 104. The input audio signal can include, for example, a query, question, command, instructions, request or other statement provided in a language. The input audio signal can include an identifier or name of a third-party (e.g., a digital component provider device 106) to which the question or request is directed. For example, the request can be for content provided by a specific digital component provider device 106.

The client computing device 104 can include, execute, or be referred to as a digital assistant device. The digital assistant device can include one or more components of the computing device 104. The digital assistant device can include a graphics driver that can receive display output from the data processing system 102 and render the display output on display 144. The graphics driver can include hardware or software components that control or enhance or how graphics or visual output is displayed on the display 144. The graphics driver can include, for example, a program that controls how the graphic components work with the rest of the computing device 104 (or digital assistant). The local digital assistant 134 can filter the input audio signal to create a filtered input audio signal, convert the filtered input audio signal to data packets, and transmit the data packets to a data processing system comprising one or more processors and memory.

The digital assistant device can include an audio driver 142 and a speaker component (e.g., transducer 140). The pre-processor component to receive an indication of the display output and instruct the audio driver 142 to generate an output audio signal to cause the speaker component (e.g., transducer 140) to transmit an audio output corresponding to the indication of the display output.

The system 100 can include, access, or otherwise interact with at least digital component provider device 106. The digital component provider device 106 can include one or more servers that can provide digital components to the client computing device 104 or data processing system 102. The digital component provider device 106 or components thereof can be integrated with the data processing system 102 or executed at least partially by the data processing system 102. The digital component provider device 106 can include at least one logic device such as a computing device having a processor to communicate via the network 105, for example with the computing device 104, the data processing system 102, or the digital component provider device 106. The digital component provider device 106 can include at least one computation resource, server, processor or memory. For example, the digital component provider device 106 can include a plurality of computation resources or servers located in at least one data center.

A digital component provider device 106 can provide audio, visual, or multimedia based digital components for presentation by the client computing device 104 as an audio output digital component, visual output digital components, or a mix thereof. The digital components can be incorporated into action data structures that are transmitted to the client computing device 104 and rendered by the client computing device 104. The digital component can be or include a digital content. The digital component can be or include a digital object. The digital component can include subscription-based content or pay-for content. A digital component can include a plurality of digital components. For example, a digital component can the text answering a question present by the user in a request. The client computing device 104 can process the text into an audio output signal. The digital components can include or can be digital movies, websites, songs, applications (e.g., smartphone or other client device applications), or other text-based, audio-based, image-based, or video-based content. The digital content provider device 106 can provide digital components generated by the digital content provider device 106, uploaded by users, or sources from other digital content provider devices 106.

The digital component provider device 106 can provide the digital components to the client computing device 104 via the network 105 and bypass the data processing system 102. The digital component provider device 106 can provide the digital component to the client computing device 104 via the network 105 and data processing system 102. For example, the digital component provider device 106 can provide the digital components to the data processing system 102, which can store the digital components and provide the digital components to the client computing device 104 when requested by the client computing device 104.

The data processing system 102 can include at least one computation resource or server. The data processing system 102 can include, interface, or otherwise communicate with at least one interface 110. The data processing system 102 can include, interface, or otherwise communicate with at least one natural language processor component 114. The data processing system 102 can include, interface, or otherwise communicate with at least one digital component selector 120. The data processing system 102 can include, interface, or otherwise communicate with at least one interface management component 135. The data processing system 102 can include, interface, or otherwise communicate with at least one data repository 124. The at least one data repository 124 can include or store, in one or more data structures or databases, logs of past requests 128, templates 130, and content data 132. The data repository 124 can include one or more local or distributed databases.

The interface 110, the natural language processor component 114, the digital component selector 120, and the interface management component 135 can each include at least one processing unit or other logic device such as programmable logic array engine, or module configured to communicate with the database repository or database 124. The interface 110, the natural language processor component 114, the digital component selector 120, interface management component 135, and the data repository 124 can be separate components, a single component, or part of multiple data processing systems 102. The system 100 and its components, such as a data processing system 102, can include hardware elements, such as one or more processors, logic devices, or circuits.

The data processing system 102 can include an interface 110. The interface 110 can be configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application, script or program installed at the client computing device 104, such as a local digital assistant 134 to communicate input audio signals to the interface 110 of the data processing system 102 and to drive components of the client computing device to render output audio signals or visual output. The data processing system 102 can receive data packets, a digital file, or other signals that include or identify an input audio signal (or input audio signals). The computing device 104 can detect the audio signal via the transducer 140 and convert the analog audio signal to a digital file via an analog-to-digital converter. For example, the audio driver 142 can include an analog-to-digital converter component. The pre-processor component can convert the audio signals to a digital file that can be transmitted via data packets over network 105.

The data processing system 102 can execute or run an NLP component 114 to receive or obtain the data packets including the input audio signal detected by the sensor 138 of the computing device 104. The client computing device 104 can also execute an instance of the client computing device 104 to process language and text at the client computing device 104. The data packets can provide a digital file. The NLP component 114 can receive or obtain the digital file or data packets comprising the audio signal and parse the audio signal. For example, the NLP component 114 can provide for interactions between a human and a computer. The NLP component 114 can be configured with techniques for understanding natural language and enabling the data processing system 102 to derive meaning from human or natural language input. The NLP component 114 can include or be configured with techniques based on machine learning, such as statistical machine learning. The NLP component 114 can utilize decision trees, statistical models, or probabilistic models to parse the input audio signal.

The NLP component 114 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings). The NLP component 114 can identify semantic representations of the identified words. By identifying semantic representations, the data processing system can match words or phrases based on their similar semantic meanings rather than specific word matches. For example, a search of an input request based on semantic representations can return the related requests.

The NLP component 114 can convert the input audio signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 114 matches the text to words that are associated, for example via training across users or through manual specification, with actions that the data processing system 102 can serve. The NLP component 114 can convert image or video input to text or digital files. For example, the NLP component 114 can detect the speech in a video file, convert the speech into text, and then process the text. The NLP component 114 can convert The NLP component 114 can process, analyze or interpret image or video input to perform actions, generate requests, or select or identify data structures.

The data processing system 102 can receive image or video input signals, in addition to, or instead of, input audio signals. The data processing system 102 can process the image or video input signals using, for example, image interpretation techniques, computer vision, a machine learning engine, or other techniques to recognize or interpret the image or video to convert the image or video to a digital file. The one or more image interpretation techniques, computer vision techniques, machine learning techniques can be collectively referred to as imaging techniques. The data processing system 102 (e.g., the NLP component 114) can be configured with the imaging techniques, in addition to, or instead of, audio processing techniques.

The NLP component 114 can obtain the input audio signal. From the input audio signal, the NLP component 114 can identify at least one request or at least one trigger keyword corresponding to the request. The request can indicate intent, digital components, or subject matter of the input audio signal. The trigger keyword can indicate a type of action likely to be taken. For example, the NLP component 114 can parse the input audio signal to identify at least one request for the current weather in at a specific location. The request may be an express request or an implied request. For example, the request "is it going to rain today" can be an express request for an indication of whether it will rain. The request "do I need an umbrella" can be an implied request for an indication of whether it will rain.

The NLP component 114 can parse the input audio signal to identify, determine, retrieve, or otherwise obtain a primary request from the input audio signal. For instance, the NLP component 114 can apply a semantic processing technique to the input audio signal to identify requests in the input audio signal. The natural language processor component 114 can identify candidate requests based on the input audio signal. For example, the natural language processor component 114 can identify a primary request in the input audio signal. The primary request can be ambiguous or unclear. The primary request can be ambiguous or unclear if the primary request has a plurality of possible responses. The primary request can be ambiguous or unclear if the quality of the input audio signal is poor and the natural language processor component 114 cannot process one or more of the terms in the input audio signal.

The NLP component 114 can determine the candidate requests based on a log of previously received input audio signals. The data processing system 102 can log previously identified requests from the previously received input audio signals. The candidate requests can be logged requests that are semantically similar to the primary request identified in the input audio signal. The NLP component 114 can rank the logged requests based on the semantic similarity between the primary request and the logged requests. For example, each of the logged requests can be one-hot encoded and converted into a vector space. The primary request can be one-hot encoded and converted into the vector space. The similarity between the primary request and the log requests can be based on the distance between the primary request and the logged requests in the vector space. The similarity between the primary request and the log requests can be based on a Pearson correlation between the primary request and the logged requests.

The data processing system 102 can execute or run an instance of the direct action API 112. The direct action API 112 can identify, select, or generate an action data structure for fulfilling a request (or candidate request) identified in the input audio signal. From the request or the trigger keyword the direct action API 112 predicts, estimates, or otherwise determines subject matter for the action data structures. The action data structures can include digital components, text, video, images, or other content that can be rendered by the client computing device 104 can render in response to transmitting an input audio signal to the data processing system 102.

The action data structures and content items can correspond to subject matter of the input audio signal. The direct action API 112 can generate a specified action to satisfy the end user's intention, primary request, or candidate requests, as determined by the NLP component 114. Depending on the action specified in its inputs, the direct action API 112 can execute code or a dialog script that identifies the parameters required to fulfill a user request. Such code can look up additional information, in the data repository 124 or transmit the action data structure (or a request generated therefrom) to a third party device to provide data to the data processing system 102 for inclusion in the action data structure. For example, the direct action API 112 can generate a search phrase that is transmitted to a search engine. The response from the search engine can be included in a response field of the action data structure. The search phrase or the request from the input audio signal can be included in an input field of the action data structure. The direct action API 112 can determine necessary parameters and can package the information into an action data structure, which can then be sent to another component such as the digital component selector component 120 or to the agent of a service provider computing device to be fulfilled. The direct action API 112 can transmit the primary request and the candidate requests to a service provider or third-party, which can return a populated action data structure in response to receiving the request. For example, a weather agent, when provided with a location, can return an action data structure that indicates the weather, such as {loc: 94035; currentWeather: sunny; hiTemp: 85; lowTemp: 60}.

The data processing system 102 can execute or run an instance of the interface management component 135. The interface management component 135 can poll, determine, identify, or select interfaces for rendering of the action data structures and of the digital components. The interface management component 135 can identify the interface of the client computing device 104. The interface management component 135 can identify one or more interfaces associated with the client computing device 104 or associated client computing devices 104. The client computing device 104 can be associated with one or more additional client computing devices 104. The client computing device 104 and additional client computing devices 104 can be associated with one another through a common application login, login, end user, or other identifier. For example, the end user of the client computing device 104 can log into an application installed on the client computing device 104 and the additional client computing devices 104. The application can be associated with or provided by the data processing system 102. Logging into the application with the same credentials can enable the data processing system 102 to link the client computing devices 104 together in the data repository 124.

The interface management component 135 can identify the interface type of the client computing device 104.

Identifying the interface type can include determining capabilities of the client computing device's interfaces. For example, the interface management component 135 can determine whether the client computing device 104 includes a display 144, an audio driver 142 (e.g., a speaker), or a combination thereof. Identifying or determining the interface type can include determining a device type of the client computing device 104. For example, the interface management component 135 can determine if the client computing device 104 is a smartphone, laptop, desktop computer, speaker-based assistant device, or other type of computing device. Identifying interface type can include determining display screen parameters (e.g., size of the display, orientation of the display, resolution of the display); applications, user agent, content, or digital components displayed on the interface or executed by the client computing device 104; or audio parameters.

The interface management component 135 can poll the client computing device 104 to determine the interface type of the client computing device 104. The interface management component 135 can poll the client computing device 104 by transmitting a message to the client computing device 104 that determines the display screen parameters and returns the data to the interface management component 135. For example, the interface management component 135 can transmit a digital component to the client computing device 104 that includes a client-executable script (e.g., JavaScript) that can determine the resolution of the display 144 and transmit the resolution data to the interface management component 135. The interface management component 135 can poll the client computing device 104 at regular intervals (e.g., responsive to receiving an input audio signal from the client computing device 104) to determine the interface type of the client computing device 104. The interface management component 135 can poll the client computing device 104 once during a registration phase. Once registered with the data processing system 102, the data processing system 102 can save the interface type associated with the client computing device 104 in the data repository 124. The interface management component 135 can retrieve the interface type from the input audio signal. For example, the client computing device 104 can include metadata with the input audio signal that indicates the interface type of the client computing device 104. The interface management component 135 can process the metadata to extract the interface type of the client computing device 104.

Based on the input audio signal, the interface management component 135 can determine which of the plurality of candidate requests to respond to. The data processing system can respond to a portion or subset of the identified plurality of candidate requests. The interface management component 135 can select a number (e.g., a portion or subset) of the plurality of candidate requests in response to the input audio signal. The interface management component 135 can select the number of candidate requests based on the interface type of the client computing device 104. For example, the interface management component 135 can select relatively more candidate requests for a client computing device 104 with a relatively larger display. For example, the interface management component 135 can determine the available space on the client computing device' display 144 for displaying responses (e.g., rendered action data structures). The interface management component 135 can select how many candidate requests to respond to based on the number of responses that will fit within available space of the display 144.

The interface management component 135 can select the number of the plurality of candidate requests based on the natural language processor component 114 determining that a term or phrase in the input audio signal can have multiple interpretations or possible responses. For example, an input audio signal that includes the phrase "Ok, how long will it take to get to work" can have multiple interpretations. The data processing system 102 can determine a first response based on whether the user intends to drive, a second response based on whether the user intends to take public transit, and a third response based on whether the user intends to walk. A request can have multiple interpretations when the request generates multiple response or when one or more fields of the request's action data structure are left empty enabling multiple responses. For example, the action data structure for the above phrase can be {start_location: "123 Main St."; destination_location: "456 $1^{st}$ Street"; method: " "}. In this example, the method of transportation is not set. Rather than generating an error message (because all the parameters of the request are not defined), the data processing system can generate candidate requests and associated action data structures. Each action data structure for the different candidate requests can include a different method of transportation in the method field.

The interface management component 135 can determine the number of the plurality of candidate requests based on a comparison between a response to a request parsed from the input audio signal and the responses to each of the plurality of candidate requests generated based on the input audio signal. For example, the natural language processor component 114 can identify from the input audio signal the request "Ok, how long will it take to get to work by car." The natural language processor component 114 can determine candidate requests that are related to the identified request. For example, the natural language processor component 114 can determine candidate requests, such as "how long will it take to get to work by public transit" and "how long will it take to get to work by bike." The response to the request may be "35 minutes by car." The response to the candidate requests can be "15 minutes by the subway" and "40 minutes by bike." The interface management component 135 can select the responses that are substantially different from the response to the request identified in the input audio signal. For example, the interface management component 135 can select, in addition to the response "35 minutes by car," the response "15 minutes by subway" because the response (e.g., the transit time) is substantially different. The difference or similarity between the responses can be determined by machine learning or with a neural network. For example, the text of each response can be converted into a vector.

The distance between the responses in the vector space can indicate the similarity (or difference) between each of the responses. Vectors closer to one another can be ranked as more similar when compared to vectors spaced farther apart. For example, the natural language processor component 114 can generate similarity scores by generating a word vector for each of the words within a response. The natural language processor component 114 can use a continuous bag-of-words neural network model or a skip-gram neural network model to generate vector representations of the words in the response. The natural language processor component 114 can use Word2Vec to generate the word vectors.

The interface management component 135 can determine the number of the plurality of candidate requests based on a generality score for each candidate requests (or a response thereto). For example, the natural language processor component 114 can identify a request with a generality score above a predetermined threshold. The generality score can be based on the number of possible responses the data processing system 102 can return in response to an input audio signal. For example, the request "what is the top speed of a 2015 Brand A car?" has a low generality score because there is substantially only one result for this request. The request "what is the top speed of a car?" can have a relatively high generality score because multiple responses could be returned. For example, the data processing system 102 could return different responses for different car categories, manufactures, or car configurations. When the generality score is high, the interface management component 135 can select a greater number of candidate requests to which the data processing system 102 provides responses to the client computing device 104.

The interface management component 135 can determine the number of the candidate requests to which the data processing system 102 provides responses based on the interface type of a second client computing device 104. The second client computing device 104 can be related to the client computing device 104 that transmitted the input audio signal to the data processing system 102. For example, the client computing device 104 can be the end user's smartphone and the second client computing device 104 can be the the end user's laptop computer. The second client computing device 104 can have a different interface type than the client computing device 104 that transmitted the input audio signal to the data processing system 102. For example, the user's smartphone can have a display of a first size and resolution and the user's laptop can have a display of a second size and resolution. The interface management component 135 can transmit a portion of the responses to the candidate requests to the client computing device 104 and the remaining portion of the responses to the candidate request to the second client computing device 104.

The digital component selector 120 can select a digital component that includes text, strings, characters, video files, image files, or audio files that can be processed by the client computing device 104 and presented to the user via the display 144 or the transducer 140 (e.g., speaker). The digital component selector 120 can select a digital component that is in responsive to the request identified by the NLP component 114 in the input audio signal. For a given request, the digital component selector 120 can select supplemental digital components that can also be provided with a primary digital component. The primary digital component can be digital component directly selected responsive to a request or candidate request. For example, the primary digital component can include an answer to a question presented in the request. The supplemental digital components can be additional digital components that provide additional information or are related to the primary digital component.

The digital component selector 120 can select which digital component provider device 106 should or can fulfill the request and can forward the request to the digital component provider device 106. For example, the data processing system 102 can initiate a session between the digital component provider device 106 and the client computing device 104 to enable the digital component provider device 106 to transmit the digital component to the client computing device 104. The digital component selector 120 can request digital component from the digital component provider device 106. The digital component provider device 106 can provide digital components to the data processing system 102, which can store the digital components in the data repository 124. Responsive to a request for a digital component, the digital component selector 120 can retrieve the digital component from the data repository 124. In response to a request for a digital component, the digital component selector 120 can select a portion or all of a digital component to provide the client computing device 104 in response to the request.

The digital component selector 120 can select multiple digital components via a real-time content selection process. The digital component selector 120 can score and rank the digital components and provide multiple digital components to inclusion in an action data structure, or more generally, for transmission to the client computing device 104. The digital component selector 120 can select one or more additional digital components that are transmitted to a second client computing device 104 based on an input audio signal (or keywords and requests contained therein). In one example, the input audio signal can include a request to start a streaming how-to video. The digital component selector 120 can select additional digital components (e.g., ads). The additional digital components can inform an end user of additional or related digital component provider devices 106 that could fulfill the request from the first client computing device 104.

The digital component selector 120 can provide the selected digital component selected in response to the request identified in the input audio signal to the computing device 104 or local digital assistant 134 or application executing on the computing device 104 for presentation. Thus, the digital component selector 120 can receive the content request from the client computing device 104, select, responsive to the content request, a digital component, and transmit, to the client computing device 104, the digital component for presentation. The digital component selector 120 can transmit, to the local digital assistant 134, the selected digital component for presentation by the local digital assistant 134 itself or a third-party application executed by the client computing device 104. For example, the local digital assistant 134 can play or output an audio signal corresponding to the selected digital component.

The data repository 124 store content data 132 that can include, for example, digital components provided by a digital component provider device 106 or obtained or determined by the data processing system 102 to facilitate content selection. The content data 132 can include, for example, digital components (or digital component object) that can include, for example, a digital component, an online document, audio, images, video, multimedia content, or third-party content. The digital component provider device 106 can provide full-length digital components to the data processing system 102 to store as content data 132. The digital component provider device 106 can provide portions of the digital components to the data processing system 102.

The data repository 124 can store templates 130. The templates 130 can be templates of action data structures. The templates 130 can include fields that the direct action API 112 can populate when fulfilling a request. The templates can include standardized fields that the direct action API 112 or third party can populate when completing or responding to a request.

The data repository 124 can store past requests 128. The past requests 128 can be past requests that are received by the data processing system 102 in input audio signal or other input signals. The past requests can be parsed from the input signals by the natural language processor component 114. The past requests 128 can be a log of past requests. The past requests 128 can be a database of requests. The database can include the text of the past requests. The database can include a vectorization of the past requests. The vector of each past request can be one-hot encoded. The vectors can be used to determine the semantic similarity between the past request and a current request.

Figure 2:
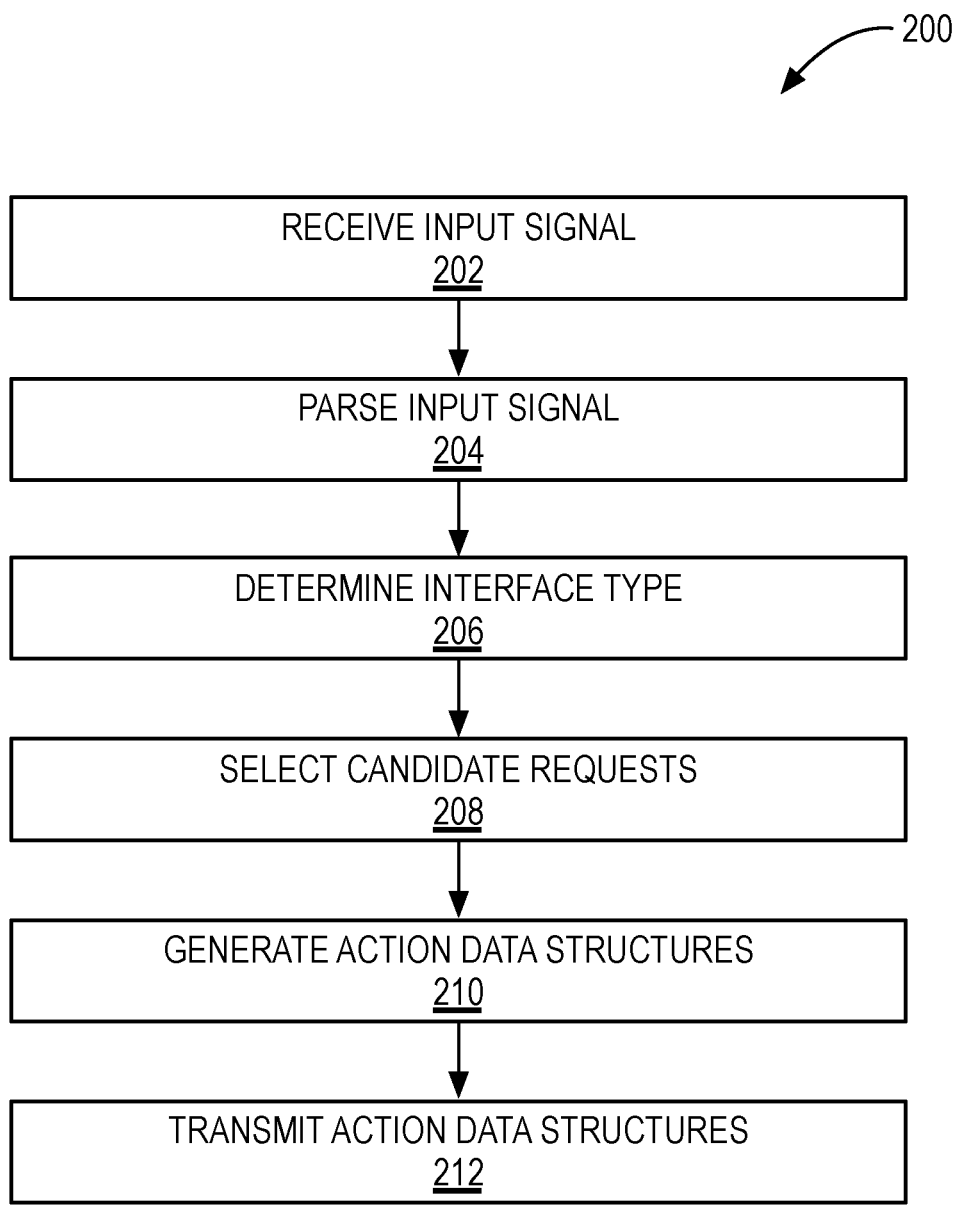
FIG. 2 illustrates a block diagram of an example method to generate a voice-based interface in a voice-activated system, in accordance with an example of the present disclosure.

FIG. 2 illustrates a block diagram of an example method 200 to generate a voice-based interface in a voice-activated system. The method 200 can include receiving an input signal (ACT 202). The method 200 can include parsing the input signal (ACT 204). The method 200 can include determining an interface type (ACT 206). The method 200 can include selecting candidate requests (ACT 208). The method 200 can include generating action data structures (ACT 210). The method 200 can include transmitting the action data structures (ACT 212).

As set forth above, the method 200 can include receiving an input signal (ACT 202). The method 200 can include receiving, by a natural language processor component executed by a data processing system, the input signal. The input signal can be an input audio signal that is detected by a sensor at a first client device. The sensor can be a microphone of the first client device. For example, a digital assistant component executed at least partially by a data processing system that includes one or more processors and memory can receive the input audio signal. The input audio signal can include a conversation facilitated by a digital assistant. The conversation can include one or more inputs and outputs. The conversation can be audio based, text based, or a combination of audio and text. The input audio signal can include text input, or other types of input that can provide conversational information. The data processing system can receive the audio input for a session corresponding to the conversation. The data processing system can receive the audio input in one or more portions or as a bulk or batch upload (e.g., multiple portions of the conversations uploaded in a single transmission to reduce the number of transmissions).

The method 200 can include parsing the input signal (ACT 204). The NLP component of the data processing system can parse the input signal to identify a plurality of candidate requests based on the input audio signal. Each of the plurality of candidate requests can be based on a different semantic meaning or interpretation of the input signal. The data processing system can identify a primary request in the input audio signal. The candidate requests can be based on the primary request. The candidate requests can be based on a term or phrase identified by the NLP component in the primary request having a plurality of interpretations. Each of the candidate requests can correspond the primary request with the term or phrase interpreted in each of the possible interpretations. For example, based on the primary request "Ok, what's the time in Greenville" the data processing system can generate the candidate requests "what's the time in Greenville, NH" and "what's the time in Greenville, SC". The data processing system can generate or select the candidate requests based on a semantic similarity between the primary request and each of the candidate requests. For example, the data processing system can search a log file of past requests. The data processing system can calculate a distance between the past requests and the primary request in a vector space. The data processing system can select the top 1, 3, 5, 10, or more past responses that are the most similar with the primary response (e.g., closest to the primary response in the vector space).

The NLP component can determine a confidence score of the primary request identified in the input audio signal. The NLP can determine a confidence score based on a semantic meaning of the primary request. The confidence score can indicate if the primary request is ambiguous or unclear. For example, if the primary request (or a term therein) has a plurality of interpretations the confidence score of the primary request's semantic meaning can be low. A low confidence score can indicate that the primary request can have multiple interpretations, multiple possible response, is a broad or generic request, or that the request does not include enough information to provide a response. A request can have multiple or different semantic meanings if a term in the request has multiple interpretations. The term can have multiple interpretations because the term has multiple definitions or because the term is a homonym or homophone (e.g., different words that have the same pronunciation). For example, the user requests information on "genes," but in an audio-based interface, the data processing system can interpret "genes" and "genes" or "jeans." A request can have multiple or different semantic meanings because the request lacks information, context, or other data. For example, the user can request the top speed of a bird without specifying what type of bird. A term can be broad when the term is a genus (e.g., a higher hierarchy) term rather than a species term. For example, Corolla (c) is a species of the broader genus term, car. The NLP component can determine to select a plurality of candidate requests when the confidence score is below a predetermined threshold, which indicates that the primary request has multiple semantic meanings.

The method 200 can include determining an interface type (ACT 206). The data processing system can determine the interface type of the client computing device that transmitted the input audio signal to the data processing system. The interface type can indicate at least one of a display format of the client device, a display size of the client device, a display availability of the client device, or a client device type. The data processing system can poll the client computing device to determine the interface type. For example, the data processing system can transmit a message to the client computing device that includes processor executable instructions that, when executed by the client computing device, determine the interface type of the client computing device. The client computing device can transmit an indication of the interface type to the data processing system when transmitting the input audio signal to the data processing system. For example, the client computing device can include an indication of the client computing device's interface type in the metadata or as a parameter of the input audio signal.

The method 200 can include selecting candidate requests (ACT 208). The data processing system can select a subset of the candidate request that the data processing system will transmit responses or action data structures to the client computing device. The subset of the candidate requests can be one or more of the candidate requests. The data processing system can select all the candidate requests. The number of candidate requests selected can be based on the interface type of the client computing device. The number of candidate requests selected can be based on a term or phrase in a primary request having a plurality of interpretations. For example, the data processing system can select the number of candidate requests that corresponds to the number of interpretations the term or phrase has. The data processing system can select the number candidate request based on a semantic similarity between a primary request and one or more past requests that are stored in a log of past requests.

Figure 3:
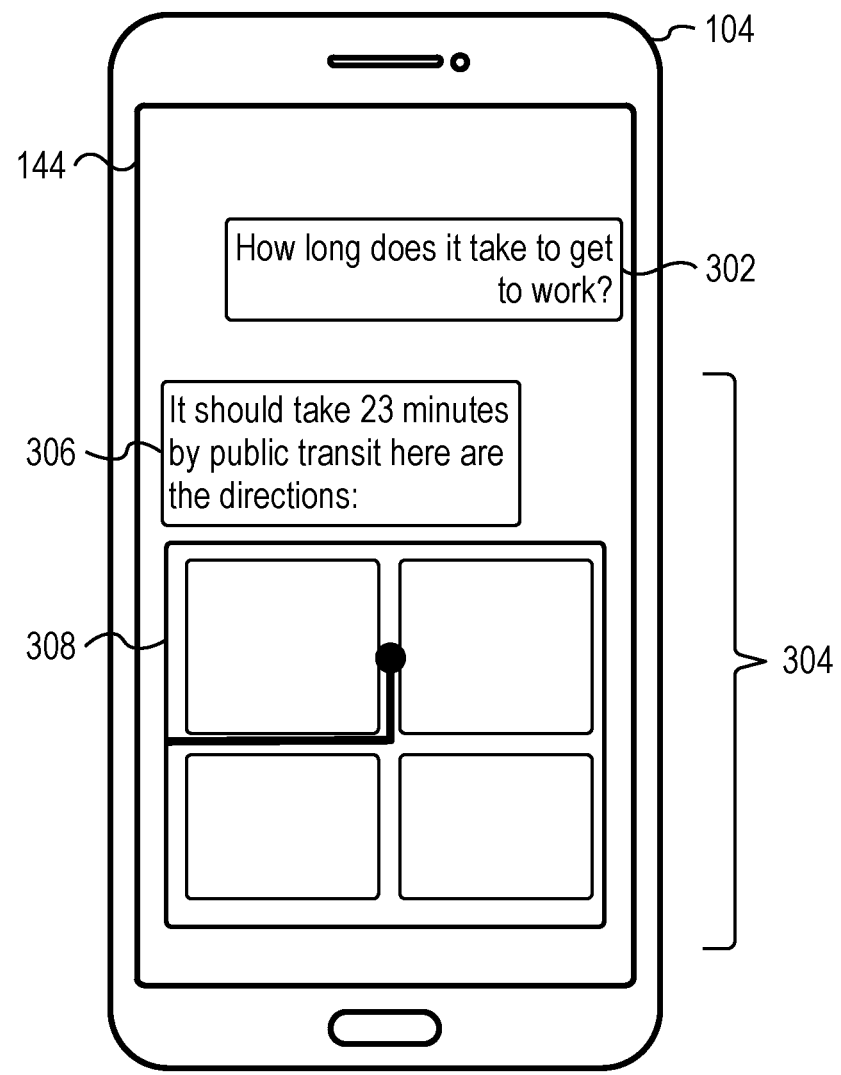
FIGS. 3 and 4 illustrate diagrams of example voice-based interfaces for presenting responses to candidate requests, in accordance with an example of the present disclosure.
Figure 4:
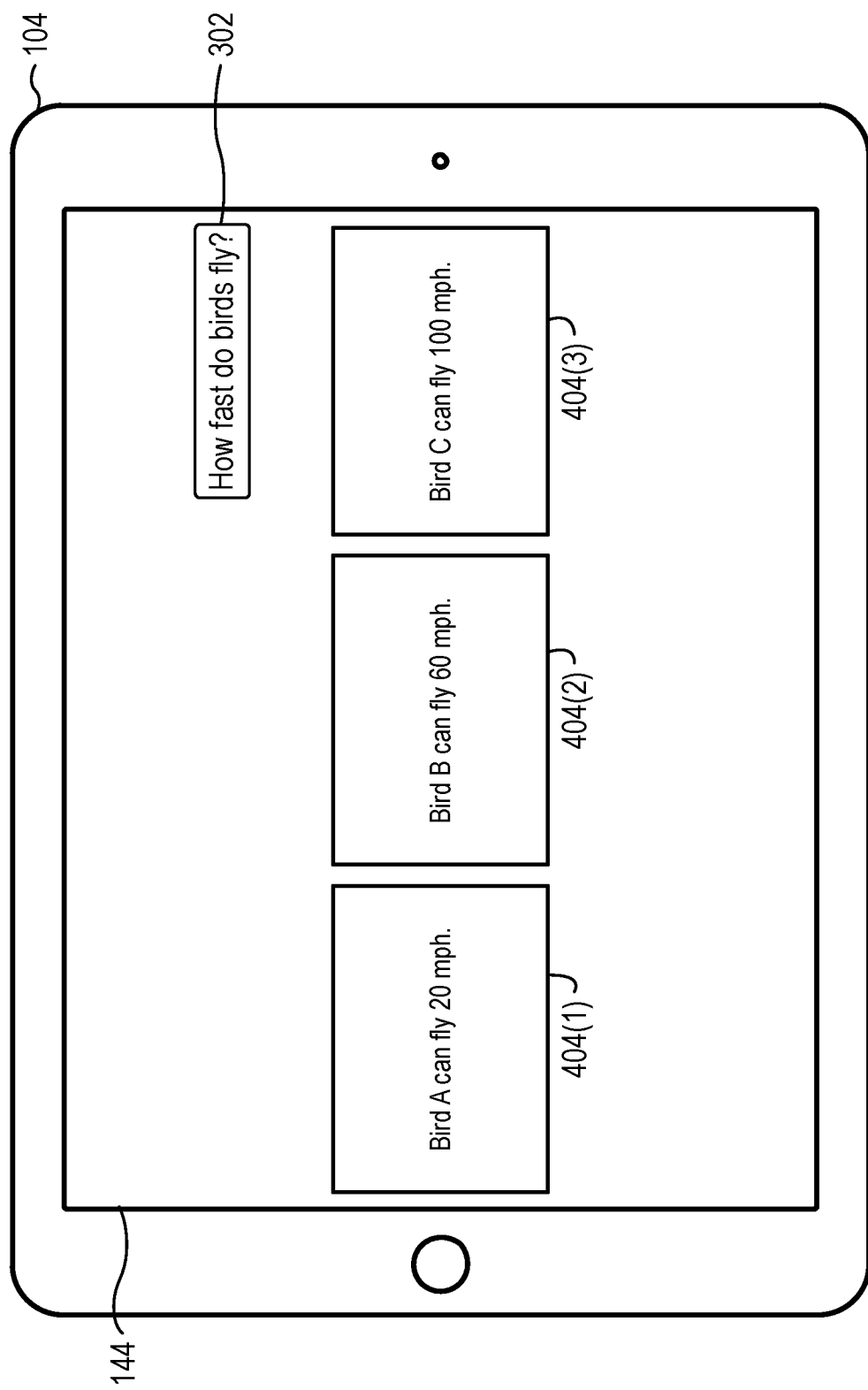

For example, and referring to FIGS. 3 and 4, among others, the data processing system can select the number of candidate requests (or the portion of the candidate requests to which the data processing system will respond) based on the interface type of the client computing device. FIG. 3 illustrates an example client computing device 104 displaying a response to a single candidate request. FIG. 4 illustrates an example client computing device 104 displaying a response to a plurality of candidate requests. In the example illustrated in FIG. 3, the client computing device 104 is a smartphone. The client computing device 104 provided an input signal. The input signal can be an audio-based signal or a text-based signal. The text 302 of the input signal can be rendered on the display 144 of the client computing device 104. The data processing system 102 can parse the text 302 of the input signal to determine the input signal includes the primary request "how long does it take to get to work." The data processing system can determine the primary request can include a plurality of candidate requests. For example, the candidate requests can be "how long does it take to get to work by car," "how long does it take to get to work by public transit," or "how long does it take to get to work by bike." As illustrated, in FIG. 3, the interface type can indicate that the display 144 is a relatively small display. In response to the interface type, the data processing system can select a single candidate request. The data processing system can generate an action data structure 304 that includes a text-based response (or portion) 306 and an image-based response (or portion) 308. The text-based response 306 can include text that is displayed or spoken to the user. The image-based response 308 can include images, videos, or other digital components that are displayed to the user. The action data structure can include an indication of the candidate request for which the action data structure was generated. For example, the text-based response 306 indicates that the data processing system returned a response to the candidate request "how long does it take to get to work by public transit."

FIG. 4 illustrates an example where the client computing device 104 displays a plurality of responses to different candidate requests. In the example illustrated in FIG. 4, the client computing device 104 is a tablet and can have a relatively larger display 144 when compared to the client computing device 104 illustrated in FIG. 3. The client computing device 104 provided an input signal. The input signal can be an audio-based signal or a text-based signal. The text 302 of the input signal can be rendered on the display 144 of the client computing device 104. The NLP component can determine that the primary request "how fast do birds fly" is generic because the request can return a plurality of possible responses. For example, the speed of the bird can depend on the type of bird on which the user intended to request the information. The data processing system can determine the primary request is generic or broad. In response to receiving a generic or broad primary request, the data processing system can transmit a message comprising a prompt. The message can be an audio signal request. The user can respond to the prompt. The client computing device 104 can capture the response as a second input audio signal that is transmitted to the data processing system 102. The data processing system can select one or more of the candidate responses (or generate new candidate responses) based on the response identified in the second input audio signal.

As illustrated in FIG. 4, the data processing system can generate a plurality of candidate responses, which can include "how fast can bird A fly," "how fast can bird B fly," and "how fast can bird C fly." The data processing system can generate additional candidate requests. Based on the interface type (e.g., the client computing device 104 having a relatively larger screen), the data processing system can select to generate responses for three of the candidate requests. The data processing system can generate an action data structure for each of the selected candidate requests. The action data structures can include an indication of the candidate request in response to which they were generated. FIG. 4 illustrates that data processing system generates three action data structures, which the client computing device 104 renders as cards 404(1), 404(2), and 404(3), which can generally be referred to as cards 404. The cards 404 can include individual responses to each of the candidate requests. The cards 404 can include text, images, videos, audio, or other forms of content or digital components. The cards 404 can be arranged in a carousel such that the user can swipe or navigate between the cards 404 to view each of the cards 404. The user can select one or more of the cards 404 to activate the card 404. Activating the card 404 can cause the user interface to display additional information associated with the card 404 or begin to play or render media (e.g., video or audio files) associated with the card 404.

The method 200 can include generating action data structures (ACT 210). The data processing system can generate an action data structure for each of selected candidate requests. The action data structure for each candidate request can include responses that include digital components, video-based content, text-based content, audio-based content, or other types of content items. The action data structure can be sent to a third-party server or the data processing system can receive data from the third-party server to fill one or more fields of the action data structure before the action data structure is transmitted to the client device. The content of the action data structure can be rendered by the client computing device and displayed to the user. Each action data structure can include a response to a respective one of the candidate requests.

The method 200 can include transmitting the action data structures (ACT 212). The data processing system can transmit the generated action data structures to the client computing device via an interface of the data processing system. The data processing system can transmit action data structures to a client device related to the client computing device. The data processing system can generate action data structures for one or more of the unselect candidate requests, which can be referred to as additional requests. The action data structures for the additional requests can be transmitted to the second client device. In an example, the client device can be a smart phone. The data processing system can select one candidate request (e.g., the highest ranked candidate request) for which an action data structure is generated as a response and transmitted to the client device. The data processing system can also generate action data structures for the next five (or other number) of candidate requests. The action data structures can be transmitted to the user's laptop computer. A notification can be sent to the smartphone indicating that additional information and possible responses are viewable on the user's laptop.

The data processing system transmit the action data structures to the client computing device to be displayed in series or in parallel with one another. For example, the data processing system can select a first and a second candidate request form a plurality of candidate request. The data processing system can generate a first action data structure for the first candidate request and a second action data structure for the second candidate request. The data processing system can transmit the first and second action data structures so that the action data structures are rendered together on the display as responses. The data processing system can transmit the first and the second action data structures to the client computing device such that the action data structures are rendered in series. For example, the first action data structure can be rendered as a first possible response to the user's input signal. Rendering the first action data structure can cause the client computing device to display the result associated with the first candidate request and an indication of the first candidate request (e.g., the text of the first candidate request). The user can clear the rendered first action data structure. For example, the user can swipe the card including the response off the screen. The client computing device can then render the second action data structure. The data processing system can cause the action data structures to be rendered in series based on the interface type of the client computing device. For example, on the relatively smaller screen of a smart phone, the action data structures can be rendered in series.

Figure 5:
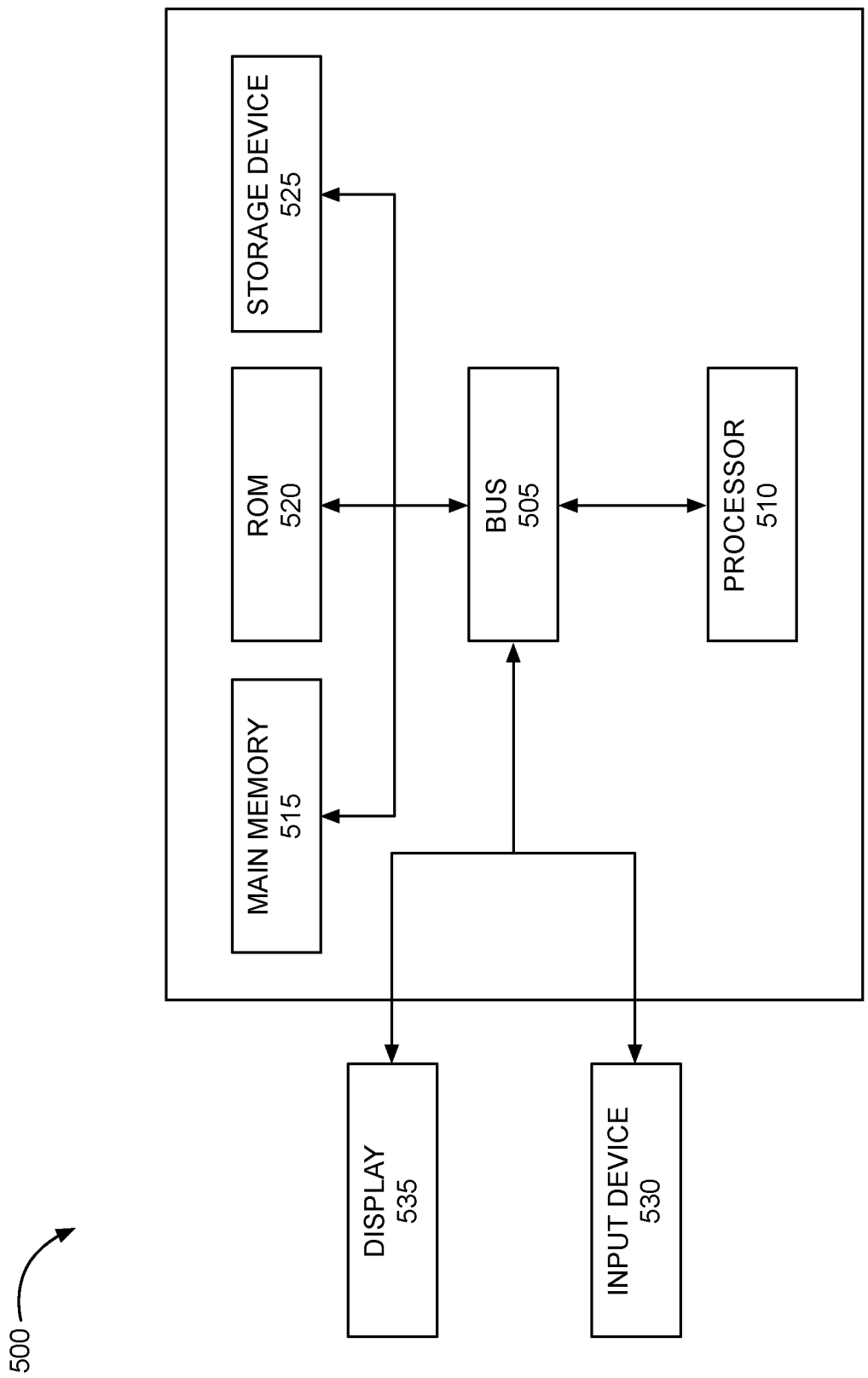
FIG. 5 illustrates a block diagram of an example computer system, in accordance with an example of the present disclosure.

FIG. 5 illustrates a block diagram of an example computer system 500. The computer system or computing device 500 can include or be used to implement the system 100, or its components such as the data processing system 102. The data processing system 102 can include an intelligent personal assistant or voice-based digital assistant. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 124. The main memory 515 can also be used for storing position information, temporary variables, or other intermediate information during execution of instructions by the processor 510. The computing system 500 may further include a read-only memory (ROM) 520 or other static storage device coupled to the bus 505 for storing static information and instructions for the processor 510. A storage device 525, such as a solid-state device, magnetic disk or optical disk, can be coupled to the bus 505 to persistently store information and instructions. The storage device 525 can include or be part of the data repository 124.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 102, the client computing device 104 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform run time environment, a virtual machine, or a combination of one or more of them. The apparatus and execution environment can realize various computing model infrastructures, such as web services, distributed computing and grid computing infrastructures. For example, the interface 110, digital component selector 120, NLP component 114, the interface management component 135, and other data processing system components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 104).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 114 or interface management component 135, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the computing device 104 can generate the packaged data object and forward it to the third-party application when launching the application. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to generate voice-based interfaces in a networked system, comprising:
    a processor, a computer-readable memory, one or more computer-readable storage media, and program instructions collectively stored on the one or more computer-readable storage media, the program instructions executable to:
    receive an input audio signal detected by a sensor of a client device;
    parse the input audio signal to identify a primary request in the input audio signal;
    determine a confidence score for a semantic meaning of the primary request;
    in response to the confidence score failing to satisfy a predetermined threshold, determine a plurality of candidate requests, each of the plurality of candidate requests corresponding to a different semantic meaning of the input audio signal;
    determine an interface type of the client device;
    select, based on semantic similarity with the primary request, a number of the plurality of candidate requests, the number being based on the interface type of the client device, and the number of the plurality of candidate requests corresponding to a subset of the plurality of candidate requests;
    generate a first action data structure for a first candidate request of the subset of the plurality of candidate requests; and
    transmit, to the client device, the first action data structure for the first candidate request of the subset of plurality of candidate requests based on the interface type of the client device.

2. The system of claim 1, wherein the interface type indicates at least one of a display format of the client device, a display size of the client device, a display availability of the client device, or a client device type.

3. The system of claim 1, the program instructions further being executable to:
    generate a second action data structure for a second candidate request of the subset of the plurality of candidate requests; and
    transmit, to the client device, the second action data structure for the second candidate request to be rendered after the first action data structure.

4. The system of claim 1, the program instructions further being executable to:
    identify a term in the input audio signal having a plurality of interpretations; and
    select the number of the plurality of candidate requests based on the term in the input audio signal having a plurality of interpretations.

5. The system of claim 1, the program instructions further being executable to:
    select the plurality of candidate requests from a log of previously received input audio signal and based at least on a semantic similarity between each of the plurality of candidate requests and the primary request.

6. The system of claim 1, the program instructions further being executable to:
    include an indication of the plurality of candidate requests in the first action data structure.

7. The system of claim 1, the program instructions further being executable to:
    select a digital component based on the primary request in the input audio signal.

8. The system of claim 1, the program instructions further being executable to:
    determine a response to the primary request;
    determine a response to each of the plurality of candidate requests; and
    select the number of the plurality of candidate requests based on a comparison between the response to the request and the response to each of the plurality of candidate requests.

9. The system of claim 1, the program instructions further being executable to:
    determine a response to the primary request;
    determine a generality score for the response to the primary request in the input audio signal;
    determine a generality score for a response to each of the plurality of candidate requests; and
    select the number of the plurality of candidate requests based on a comparison of the generality score for the response to the request in the input audio signal and the generality score for the response to each of the plurality of candidate requests.

10. The system of claim 1, the program instructions further being executable to:
    transmit an audio signal request comprising a prompt;
    receive a second input audio signal from the client device, the second input audio signal generated in response to the prompt; and
    select the number of the plurality of candidate requests based the second input audio signal.

11. The system of claim 1, the program instructions further being executable to:
   generate a second action data structure for a second candidate request of the subset of the plurality of candidate requests;
   select a second client device associated with the client device, the second client device having an interface with an interface type different than the interface type of the client device; and
   transmit the second action data structure to the second client device.

12. The system of claim 1, the program instructions further being executable to:
   receive a second input audio signal detected by the sensor of the client device;
   parse the second input audio signal to identify a candidate request based on the second input audio signal; and
   transmit the candidate request to the client device.

13. A method, implemented by one or more processors, to generate voice-based interfaces in a networked system, comprising:
   receiving an input audio signal detected by a sensor of a client device;
   parsing the input audio signal to identify a primary request in the input audio signal;
   determining a confidence score for a semantic meaning of the primary request;
   in response to the confidence score failing to satisfy a predetermined threshold, determining a plurality of candidate requests, each of the plurality of candidate requests corresponding to a different semantic meaning of the input audio signal;
   determining an interface type of the client device;
   selecting, based on semantic similarity with the primary request, a number of the plurality of candidate requests, the number being based on the interface type of the client device;
   generating an action data structure for each of the number of the plurality of candidate requests based on the interface type of the client device; and
   transmitting the action data structure for each of the portion of plurality of candidate requests based on the interface type of the client device.

14. The method of claim 13, wherein the interface type indicates at least one of a display format of the client device, a display size of the client device, a display availability of the client device, or a client device type.

15. The method of claim 13, comprising:
   identifying a term in the input audio signal having a plurality of interpretations; and
   selecting the number of the plurality of candidate requests based on the term in the input audio signal having a plurality of interpretations.

16. The method of claim 13, comprising:
   selecting the plurality of candidate requests from a log of previously received input audio signal and based at least on a semantic similarity between each of the plurality of candidate requests and the primary request.

17. The method of claim 13, comprising:
   determining a response to the primary request;
   determining a response to each of the plurality of candidate requests; and
   selecting the number of the plurality of candidate requests based on a comparison between the response to the primary request and the response to each of the plurality of candidate requests.

* * * * *